United States Patent
Sunkavally

(10) Patent No.: US 10,776,481 B2
(45) Date of Patent: Sep. 15, 2020

(54) MANAGING PASSWORDS

(71) Applicant: EMC IP HOLDING COMPANY LLC, Hopkinton, MA (US)

(72) Inventor: Naveen Sunkavally, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 16/176,223

(22) Filed: Oct. 31, 2018

(65) Prior Publication Data

US 2020/0134169 A1     Apr. 30, 2020

(51) Int. Cl.
  *G06F 21/00* (2013.01)
  *G06F 21/46* (2013.01)
  *G06N 20/00* (2019.01)

(52) U.S. Cl.
  CPC .......... *G06F 21/46* (2013.01); *G06N 20/00* (2019.01)

(58) Field of Classification Search
  CPC ................................ G06F 21/46; G06N 20/00
  See application file for complete search history.

(56) References Cited

U.S. PATENT DOCUMENTS

| | | | | |
|---|---|---|---|---|
| 2012/0284783 | A1* | 11/2012 | Jakobsson | G01B 9/02083 726/6 |
| 2014/0282939 | A1* | 9/2014 | Pieczul | H04L 63/083 726/6 |
| 2014/0373088 | A1* | 12/2014 | Aggarwal | G06F 21/604 726/1 |
| 2015/0033303 | A1* | 1/2015 | VanBlon | G06F 21/46 726/6 |
| 2018/0012014 | A1* | 1/2018 | Sahin | G06F 21/00 |
| 2019/0121953 | A1* | 4/2019 | Chari | H04L 63/0815 |

\* cited by examiner

*Primary Examiner* — Jeffrey C Pwu
*Assistant Examiner* — William A Corum, Jr.
(74) *Attorney, Agent, or Firm* — Krishnendu Gupta; Anne-Marie Dinius

(57) ABSTRACT

A method is used in managing passwords. A proposed new password is received. The proposed new password is associated with contextual information indicating a context in which the proposed password is to be used. A machine learning model is dynamically selected from a set of machine learning models based on the contextual information. A quality metric is derived from the proposed new password based on the selected machine learning model.

16 Claims, 3 Drawing Sheets

EXEMPLARY ENTERPRISE CONTEXTS FOR DELL INC.

| | DELL EMC | VMWARE | PIVOTAL | RSA |
|---|---|---|---|---|
| | ORGANIZATIONAL CONTEXTS | | | |
| NORTH AMERICA | | | | |
| SOUTH AMERICA | | | | RSA, SecurID, Netwitness, Archer, SouthAm, Messi, Ronaldo |
| EUROPE | | | | |
| ASIA | | | | |

FIG. 2

MANAGING PASSWORDS

FIELD OF THE INVENTION

This application relates to managing passwords.

BACKGROUND

The rush of cloud adoption and the explosion in mobile device usage have left organizations with information scattered across resources and applications, both inside and outside the traditional perimeter. Each of these applications and information sources requires unique access, creating "islands of identity" that become increasingly complex to manage—while making it more difficult for users to quickly and conveniently access what they need to do their jobs. As users travel from application to application (or island to island), they must remember multiple credentials, including usernames and passwords, while grappling with varying access policies and processes.

In many cases, a company could use multiple approaches to securing its islands of identity—perhaps a VPN, PAM, internal web portal and multiple SaaS vendors. Each resource is working to protect access to its assigned area, but the company as a whole lacks centralized visibility, a convenient user experience, and a consistent approach to authentication policies and procedures.

For IT security and operations teams, these daily realities complicate the authentication and identity process:

The VPN gauntlet. As more and more data moves to the cloud, IT defaults to what it knows, requiring everyone to access cloud apps through the VPN. This introduces a complex user experience, duplicates authentication processes and forfeits the benefits of always-on mobile cloud access.

The Fort Knox paradox. Information Technologist's historic approach has been to implement the strongest form of authentication available, all the time. In a perimeter-less world, you need the flexibility to apply intelligent, appropriate control, without frustrating users or disrupting business continuity.

Mob rule. Users demand access to an ever-widening array of applications, via a similarly expanding range of mobile devices. Increasingly distributed workforces drive toward two seemingly competing objectives: convenient access for users and secured access for IT.

Balancing the needs of the company or enterprise to limit access to its most valuable information against those of users who want convenient access to enterprise data is an ongoing challenge. Even today, most enterprises use password rules such as length requirements combined with character mandates. There is thus a need to enhance security in administering password authentication policies.

SUMMARY

A method is used in managing passwords. A proposed new password is received. The proposed new password is associated with contextual information indicating a context in which the proposed password is to be used. A machine learning model is dynamically selected from a set of machine learning models based on the contextual information. A quality metric is derived from the proposed new password based on the selected machine learning model.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 2 depicts a table showing exemplary enterprise contexts for a corporation according to embodiments.

DETAILED DESCRIPTION

Figure 1:
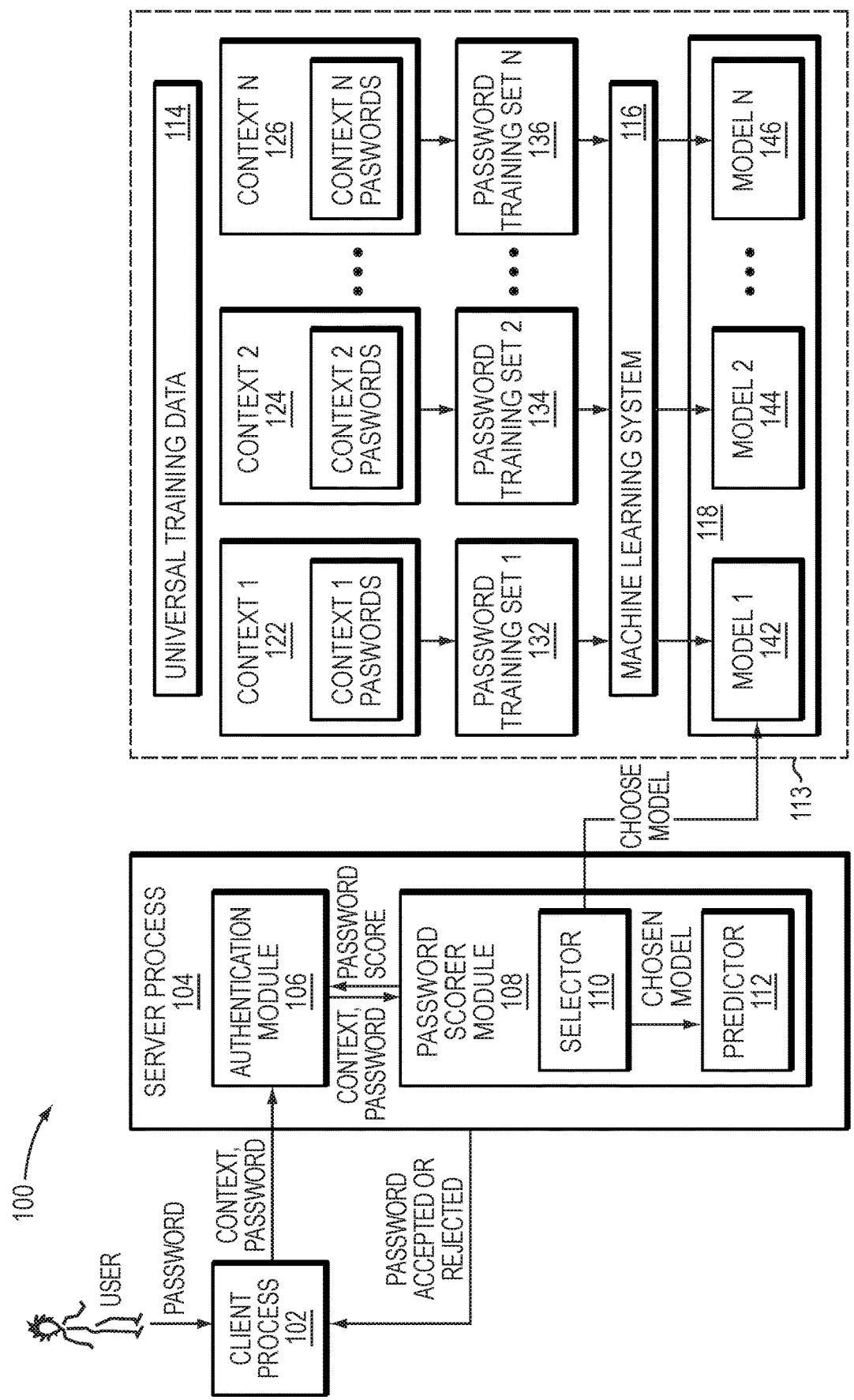
FIG. 1 depicts an architectural overview of a system according to embodiments herein.

Described below is a technique for use in managing passwords, which technique may be used to provide, among other things, receiving a proposed new password, the proposed new password being associated with contextual information indicating a context in which the proposed password is to be used, based on the contextual information, dynamically selecting a machine learning model from a set of machine learning models, and based on the selected machine learning model, deriving a quality metric from the proposed new password.

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "machine learning system" and "password quality measurement system" and the like as used herein are intended to be broadly construed, so as to encompass, for example, systems deployed on or in private or public cloud computing, private or public networks, private or public data storage systems, or any other electronic device protected by password authentication.

Similarly, the term "enterprise" is to be construed broadly to include, without limitation, an organization, a network, a group, an affiliation, a team, a league, humans organized by one or common attributes, machines organized by one or more common attributes, and the like. The term "password" is to be construed broadly so as to encompass, without limitation, any combination of information, for example, whether text, photographic, audio, optical, biometric, and the like, used to grant or deny access to something tangible, such as without limitation, a network, data, a public or private cloud, a physical location, a virtual location, a web browser, an API, a portal, an enterprise cloud, and the like.

A given embodiment may more generally comprise any arrangement of one or more devices.

As used herein, the following terms and phrases have the following illustrative meanings: "application" generally refers to one or more software programs designed to perform one or more functions; "metadata" generally refers to data that describes or defines other data; "enterprise cloud" generally refers to a computing environment residing behind a firewall that delivers software, infrastructure, and platform services to an enterprise.

In recent years, techniques using statistics and machine learning have emerged for assessing user password quality, also known as password strength. These techniques compute a "guessability" score by comparing a user's password to a known set of bad or breached passwords. The score is used to guide users towards picking passwords that are not similar to known bad or breached passwords. Even though such techniques are better than simply using password rules (e.g. password must be of a certain length and contain certain character combinations) that reduce the probability of user account compromise, such conventional techniques only operate on training sets containing globally known bad or breached passwords.

Generally, user passwords are, often associated with context in which they are used. For instance, a user who works at Dell EMC might choose his or her password to be "DellEMC1975!" or a user using Salesforce might choose a password like "Sales4rce!". These passwords aren't ostensibly bad until one considers the context in which they're used. Attackers that are attempting to comprise security of an enterprise are often aware of this context and such attackers can alter their password attacks based on their target of compromise. Conventionally, such context specific information associated with a password is not taken into account when evaluating quality of a password.

By contrast, in at least some implementations in accordance with the technique as described herein, one or more machine learning models based on contextual information are used when authenticating a password. At the time of a user authentication, a machine learning model is selected dynamically based on contextual information and such selected machine learning model is used for generating a password score indicating quality of the password. Such password score is then used by an authentication system to determine whether it is okay to accept the password.

In at least some implementations in accordance with the current technique as described herein, the use of the managing passwords technique can provide one or more of the following advantages: improving authentication of passwords, efficient evaluation of quality of passwords, and generating passwords that are more resilient to compromise by attackers.

FIG. 1 depicts a password quality measurement system 100 that is used in embodiments herein. The password quality measurement system 100 is used when a user seeks to initially establish a password, reset a password, or use a password. In current embodiments, rather than relying on historical or static information in isolation, such as prior breached passwords or minimum character strings required for passwords, the systems, methods, and products taught herein uses dynamically created context-specific information relevant to a particular enterprise.

In this way, password strength is improved because the vulnerability of context-specific passwords is taken into consideration when determining if a new password is sufficiently strong to be approved. Of course, in embodiments, an administrator optionally may chose to configure a minimum password strength threshold in order for a new password to be acceptable. In these embodiments, heightened security requirements, which are data dependent, are implemented. The greater the desire to protect access to the data, the higher the setting will be for the password security threshold.

In at least one embodiment, contexts are defined at the enterprise level. However, in other embodiments, contexts may also be defined at a user level or based on applications used by the user. Contexts are also established by using attributes related to the enterprise. In some embodiments, these contexts are static. In other embodiments, they fluctuate over time. Some examples, without limitation, of contextual information are: organization, division, location, department, applications with unique logins, user types, product names, an application to which a user seeks access, a service to which a user seeks access, and the like. Thus, contextual information can be associated with a user of any information associated with authentication action. Each context corresponds to a set of passwords users within that context are likely to use. Additionally, the breadth of contexts spreads beyond the specific attributes themselves in some embodiments. An enterprises may choose to establish a single context or multiple contexts.

FIG. 2 is illustrative. In this example, we use Dell as an enterprise comprising of four strategic business units, Dell EMC, VMWare, Pivotal, and RSA. Users from each of these strategic business units, as an example, is located in North America, South America, Europe, and Asia. In this example, we omit application, assuming that single-sign-on has been implemented across all applications users use at Dell, and therefore, there is only one login that users use. Taking the user's division and location into account in this example, we end up with a set of contexts containing, for example, 16 different contexts, as shown in FIG. 2. The contextual relationships and information in embodiments are enhanced by increasing the breadth of each context. One way this is done is by adding terms relevant to that particular context, which the enterprise wants to dissuade users from within that context from using in their passwords. For instance, the context "RSA-South America" includes RSA-specific terms such as "RSA", "Securld", "Netwitness", "Archer" and terms that might crop up frequently in South America like "Messi" or "Ronaldo." This information forms the basis of a machine learning model used for a user from RSA who is located in South America.

Referring to FIG. 1, we show a process for developing machine learning models 113 based on these contexts. The machine learning models 113 can be contextual only or contextual combined with universal training data 114, which in some embodiments includes a set of vulnerable passwords. In the illustrative example using Dell as an enterprise, the number of contexts, N, is 16. For example, RSA-South America is context 1 122, Dell EMC-South America is context 2, 124 and Pivotal-North America is context N 126. In this situation, machine learning algorithms populate the respective password training sets 132, 134, 136 for each of these contexts. Machine learning system 116 could be a processor, a special purpose ASIC, or similar device running machine learning algorithms known to those of skill in the art.

In some embodiments, one or more password training sets 132, 134, 136, are constructed from contextual information only. In alternate embodiments, one or more password training sets 132, 134, 136 are constructed from contextual information and universal training data 114.

Those of skill in the art will recognize that context information may change over time. The machine learning algorithms used to generate the set of models 118 (also referred to herein as "machine learning models") are designed to accommodate these fluctuations or changes in contextual information. For example, if one year the Olympics were being hosted in South America, the divisions located in South America, may add the term "Olympics" to the list of password terms to be avoided within the machine learning model.

In some embodiments password security is enhanced by combining contextual information with a universal training set of vulnerable passwords. Vulnerable passwords are passwords that are known to be bad, regardless of the user's context. Those of skill in the art recognize that vulnerable passwords are publicly available on the dark web, for example, or in databases such as those administered by the company known as 1password.

Combining the contextual information with vulnerable passwords contained in universal training data 114 is done in a variety of ways. One example is to associate a weight to each vulnerable password. The weight is used as part of the cost function that is computed as part of training machine learning models. Vulnerable terms within a context are given a large weight relative to terms in the universal training set to ensure that contextual terms are fairly represented in the final trained model.

In our example, as illustrated in FIG. 2, 16 different training sets are generated after combining each of the 16 contexts with the universal training set. The machine learning system then trains separate models for each training set, producing 16 different models. It should be noted that, "a machine learning system", for example, may signify any process that takes a set of passwords as an input and produces a model that can be used to compute a password "guessability" score when the model is provided an input password for evaluation.

Figure 3:
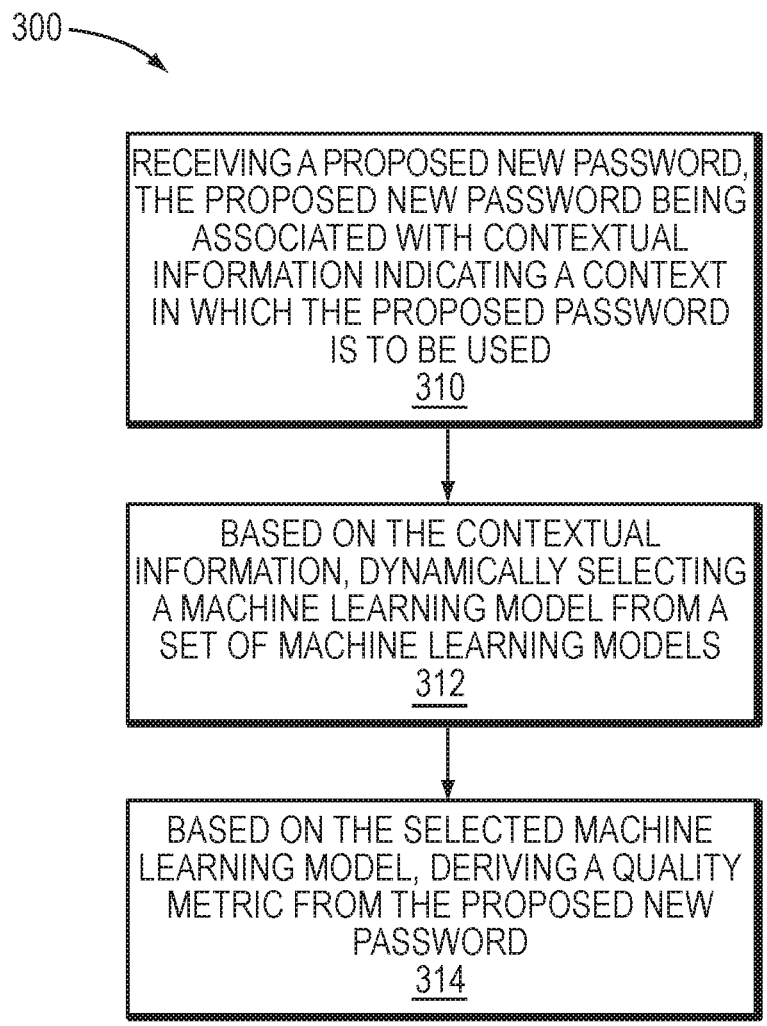
FIG. 3 depicts a flow chart showing steps of method embodiments disclosed herein.

Referring to FIG. 1 and FIG. 3, shown is a flow diagram illustrating managing passwords. In at least one embodiment of the current technique, the user authentication flow consists of a client process 102 and a server process 104. The client process 102 is a component running locally on the user's device that carries out the authentication process on behalf of the user. This could be, for example and without limitation, an application running in a web browser on a user's laptop, a mobile app on the user's phone, or an operating system. The server process 104 handles server-side authentication functions, often residing on one or more remote hosts over the network. Note that the word "process" is a logical term and does not imply a single operating system process.

Let's suppose a user is setting or resetting his or her password. The user enters his or her proposed new password into an end-user application or into an API or other similar interface for a service. The client process 102 submits the proposed new password, along with relevant contextual information such as contextual metadata, to the User Authentication 106 module of the server process 104. In this way, the Server Process receives 310 the proposed new password as well as contextual information indicating a context in which the proposed password is to be used. The User Authentication Module 106 gathers contextual metadata related to the user, the user's organization or enterprise, an application or service to which the user seeks access, and optionally additional contextual metadata from other back-end systems (not shown in the diagram above) to establish a full context.

The context and the proposed new password are sent to a Password Scorer module 108, which also includes a Selector 110 and a Predictor 112. Based on the contextual information, the Selector 110 dynamically selects 312 a machine learning model 142, 144, or 146 from a set of machine learning models 118. The Selector 110 provides the chosen machine learning model 142, 144, or 146 to the Predictor 112. Based on the selected machine learning model, the Predictor 112 derives a password score for the proposed new password.

In some embodiments, the predictor 112 generates a "guessability" or strength score, which is used to determine 314 if the proposed new password is acceptable. Once the server process 104 has determined whether the proposed new password is sufficiently secure, the server process 104 notifies the client process 102 of the acceptance or rejection of the proposed new password.

In alternate embodiments, processes depicted on the server process 104, such as the authentication module 106 or the password scorer module 108 or both are performed at the client 102. Likewise, it is entirely possible for trained machine learning models 113 to run completely client-side 102 on the end user's device. In a "hybrid" embodiment, work is shared evenly between the client 102 and server 104. For instance, the model 142, 144 or 146 can be chosen dynamically by the server process 104, and the chosen model 142, 144, or 146 could be evaluated at the client 102.

Another variation on the above embodiments involves dynamically generating machine learning models. The universal training set 114 can change, for instance, if a new data breach comes to light. In these embodiments, contextual training data is updated by enterprise administrators or automated systems. As training sets or contexts change, new models 118 can be generated offline.

The embodiments above do not presuppose where the server process or machine learning components reside. They could be hosted on premise within the purview of an enterprise or hosted as a service by a trusted third party.

Further, it should be noted that, techniques described herein can be employed when a new password is selected by a user in some embodiments and in other embodiments, such techniques can be employed each time a user uses his/her password during an authentication action.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for use in managing passwords, the method comprising:
   receiving a proposed new password, the proposed new password being associated with contextual information indicating a context in which the proposed password is to be used;
   based on the contextual information, dynamically selecting a machine learning model from a set of machine learning models;
   based on the selected machine learning model, deriving a quality metric from the proposed new password;
   establishing a set of contexts based on contextual information, each context of the set of contexts being associated with a set of passwords likely to be used by a user within the respective context, wherein the contextual information includes one or more of organizational information, user information, an application to which the user seeks access, or a service to which the user seeks access; and generating the set of machine learning models by associating each context of the set of contexts with a respective password training set for generating a respective machine learning model.

2. The method of claim 1, further comprising:

based on the quality metric, determining whether to approve the proposed new password.

3. The method of claim 1, wherein the quality metric includes a password score.

4. The method of claim 1, wherein a password training set further comprises a plurality of vulnerable passwords.

5. The method of claim 4, wherein generating a machine learning model further comprising:

associating each vulnerable password of a password training set used for generating the machine learning model with a weight.

6. The method of claim 5, wherein evaluating the quality metric of the proposed new password using the selected machine learning model includes computing a password score for the proposed new password.

7. The method of claim 1, further comprising:

providing the proposed new password and contextual metadata to a password scorer module for dynamically selecting the machine learning model and evaluating the quality metric of the proposed new password using the selected machine learning model, wherein a user authentication module is further configured to determine whether to allow the user to establish the proposed new password based on the quality metric of the proposed new password.

8. The method of claim 7, wherein the user authentication module gathers additional contextual metadata and provides the additional contextual metadata to the password scorer module for evaluating the quality metric of the proposed new password.

9. A system for managing passwords comprising a memory and a processor configured to:

receive a proposed new password, the proposed new password being associated with contextual information indicating a context in which the proposed password is to be used;

based on the contextual information, dynamically select a machine learning model from a set of machine learning models;

based on the selected machine learning model, derive a quality metric from the proposed new password;

establishing a set of contexts based on contextual information, each context of the set of contexts being associated with a set of passwords likely to be used by a user within the respective context, wherein the contextual information includes one or more of organizational information, user information, an application to which the user seeks access, or a service to which the user seeks access; and generating the set of machine learning models by associating each context of the set of contexts with a respective password training set for generating a respective machine learning model.

10. The system of claim 9, further comprising:

based on the quality metric, determining whether to approve the proposed new password.

11. The system of claim 9, wherein the quality metric includes a password score.

12. The system of claim 9, wherein a password training set further comprises a plurality of vulnerable passwords.

13. The system of claim 12, wherein generating a machine learning model further comprising:

associating each vulnerable password of a password training set used for generating the machine learning model with a weight.

14. The system of claim 13, wherein evaluating the quality metric of the proposed new password using the selected machine learning model includes computing a password score for the proposed new password.

15. The system of claim of claim 9, the processor is further configured to: provide the proposed new password and contextual metadata to a password scorer module for dynamically selecting the machine learning model and evaluating the quality metric of the proposed new password using the selected machine learning model, wherein a user authentication module is further configured to determine whether to allow the user to establish the proposed new password based on the quality metric of the proposed new password.

16. The system of claim 15, wherein the user authentication module gathers additional contextual metadata and provides the additional contextual metadata to the password scorer module for evaluating the quality metric of the proposed new password.

* * * * *